US009975985B2

(12) United States Patent
Ji et al.

(10) Patent No.: US 9,975,985 B2
(45) Date of Patent: May 22, 2018

(54) POLYISOCYANATE MODIFIED WITH SULPHAMIC ACID, PREPARATION METHOD THEREOF AND USE THEREOF

(71) Applicants: Wanhua Chemical Group Co., Ltd., Yantai (CN); Wanhua Chemical (Guangdong) Co., Ltd., Zhuhai (CN); Wanhua Chemical (Ningbo) Co., Ltd., Ningbo (CN)

(72) Inventors: Xueshun Ji, Yantai (CN); Yunquan Jin, Yantai (CN); Zhengchao Lin, Yantai (CN); Zhen Wang, Yantai (CN); Ruiquan Qi, Yantai (CN)

(73) Assignee: Wanhua Chemical Group Co., Ltd. (CN)

( * ) Notice: Subject to any disclaimer, the term of this patent is extended or adjusted under 35 U.S.C. 154(b) by 85 days.

(21) Appl. No.: 14/914,223

(22) PCT Filed: Sep. 26, 2013

(86) PCT No.: PCT/CN2013/084311
§ 371 (c)(1),
(2) Date: Feb. 24, 2016

(87) PCT Pub. No.: WO2015/035673
PCT Pub. Date: Mar. 19, 2015

(65) Prior Publication Data
US 2016/0280836 A1 Sep. 29, 2016

(30) Foreign Application Priority Data
Sep. 13, 2013 (CN) .......................... 2013 1 0416013

(51) Int. Cl.
| C08G 18/08 | (2006.01) |
| C09D 175/04 | (2006.01) |
| C08G 18/73 | (2006.01) |
| C08G 18/75 | (2006.01) |
| C08G 18/62 | (2006.01) |
| C08G 18/70 | (2006.01) |
| C08G 18/80 | (2006.01) |
| C08G 18/28 | (2006.01) |

(52) U.S. Cl.
CPC ....... *C08G 18/0828* (2013.01); *C08G 18/283* (2013.01); *C08G 18/288* (2013.01); *C08G 18/622* (2013.01); *C08G 18/706* (2013.01); *C08G 18/73* (2013.01); *C08G 18/751* (2013.01); *C08G 18/755* (2013.01); *C08G 18/8083* (2013.01); *C08G 18/8096* (2013.01); *C09D 175/04* (2013.01); *C08G 2170/80* (2013.01)

(58) Field of Classification Search
CPC .............. C08G 18/0282; C08G 18/283; C08G 18/288; C08G 18/622; C08G 18/706; C08G 18/73; C08G 18/751; C08G 18/755
See application file for complete search history.

(56) References Cited

U.S. PATENT DOCUMENTS

| 3,996,223 A | 12/1976 | Gupta et al. |
| 4,255,569 A | 3/1981 | Muller et al. |
| 4,837,359 A | 6/1989 | Woynar et al. |
| 4,960,848 A | 10/1990 | Scholl et al. |
| 4,994,541 A | 2/1991 | Dell et al. |
| 5,064,960 A | 11/1991 | Pedain et al. |
| 5,076,958 A | 12/1991 | Pedain et al. |
| 5,098,983 A | 3/1992 | Mosbach et al. |
| 5,334,637 A | 8/1994 | Zwiener et al. |
| 5,583,176 A | 12/1996 | H aberle |
| 5,914,383 A | 6/1999 | Richter et al. |
| 9,567,485 B2 * | 2/2017 | Shigemori ............. B05D 7/532 |
| 2004/0034162 A1 | 2/2004 | Laas et al. |
| 2007/0010573 A1 | 1/2007 | Kong et al. |
| 2010/0183883 A1 | 7/2010 | Schaefer et al. |
| 2012/0041142 A1 | 2/2012 | Nennemann et al. |

FOREIGN PATENT DOCUMENTS

| CN | 1429240 A | 7/2003 |
| CN | 1190450 A | 2/2005 |
| CN | 101754990 A | 6/2010 |
| CN | 102516187 A | 6/2012 |
| DE | 1954093 A1 | 6/1970 |
| DE | 1670666 A1 | 7/1971 |
| DE | 2414413 A1 | 10/1975 |
| DE | 2452532 A1 | 5/1976 |
| DE | 2641380 A1 | 3/1978 |
| DE | 3700209 A1 | 7/1988 |
| DE | 3900053 A1 | 7/1990 |
| DE | 3928503 A1 | 3/1991 |
| DE | 4433929 A1 | 3/1996 |
| EP | 0336205 A2 | 10/1989 |
| EP | 0339396 A1 | 11/1989 |
| EP | 0443138 A1 | 8/1991 |
| EP | 0548669 A2 | 6/1993 |
| EP | 0798299 A1 | 10/1997 |
| GB | 1145952 A | 3/1969 |
| GB | 1244416 A | 9/1971 |
| WO | 2010112156 A1 | 10/2010 |
| WO | WO 2014009221 A1 * | 1/2014 ............. B05D 7/532 |

OTHER PUBLICATIONS

International Search Report for Application No. PCT/CN2013/084311 dated Jun. 17, 2014.

* cited by examiner

*Primary Examiner* — Michael L Leonard
(74) *Attorney, Agent, or Firm* — Lerner, David, Littenberg, Krumholz & Mentlik, LLP

(57) ABSTRACT

A polyisocyanate modified with sulphamic acid and a mixture thereof, the preparation method thereof, and the use thereof in the production of polyurethane, especially as a cross-linking ingredient in the field of aqueous coatings and adhesives containing groups that are capable of reacting with isocyanate groups.

18 Claims, No Drawings

POLYISOCYANATE MODIFIED WITH SULPHAMIC ACID, PREPARATION METHOD THEREOF AND USE THEREOF

CROSS-REFERENCE TO RELATED APPLICATIONS

The present application is a national phase entry under 35 U.S.C § 371 of International Application No. PCT/CN2013/084311 filed Sep. 26, 2013, which claims priority from Chinese Application No. 201310416013.2 filed Sep. 13, 2013, all of which are hereby incorporated herein by reference.

FIELD OF THE INVENTION

The present invention relates to modified polyisocyanates and a mixture thereof, the preparation method thereof and the use thereof in the production of polyurethanes, especially the use as cross-linking components in the field of aqueous coatings and adhesives comprising groups capable of reacting with isocyanate groups.

BACKGROUND OF THE INVENTION

Recently, with the increasing focus on the environmental protection, water-dispersible polyisocyanates have been more and more widely used in each field because they are environmental friendly. First of all, they can be used as cross-linking agents to prepare two-component aqueous coatings with good properties; Secondly, they can be used in aqueous dispersion adhesives as additives; besides, they can be used to cross-link other aqueous dispersions in textile finishing and printing, and can be used as auxiliaries for paper humidifying treatment.

At present, water-dispersible modified polyisocyanates can be generally divided into two categories: non-ion modified polyisocyanates and ion modified polyisocyanates. The non-ion modified polyisocyanates mainly employ polyethers as raw materials for modificatoin. Although polyisocyanates that modified with polyethers have been widely accepted in the market, they still have many defects: for example, a large amount of polyethers must be used to provide polyisocyanates a good water-dispersity, which significantly decreases the concentration of isocyanates in the polyisocyanate system; secondly, the assistance of large shearing force is required for modified polyisocyanates to be dispersed completely in water; moreover, a huge amount of polyethers will be present in the solidified coating films, which will influence the water resistance of the coating films permanently.

In order to solve these problems, hydrophilic modifications of polyisocyanates have been achieved by adding hydrophilic ionic groups into polyisocyanates, and successes have been widely achieved.

In EP0443138A and EP0548669A, a method of introducing carboxy groups to modify polyisocyanates is provided. When carboxy groups are neutralized, modified polyisocyanates can be dispersed in water easily without a high shearing force. But the defects are polyisocyanates modified with carboxylic acids cannot be dispersed in the system with pH less than 5; besides, ions formed after neutralization by tertiary amines are good catalysts for self-polymerizations of isocyanates, which will result in a decrease of storage stability of modified poyisocanates. Therefore, polyisocyanates modified with carboxy groups can only be stored in unneutralized forms, and will be neutralized before being used, which is hard and tedious to operate.

In CN101754990A, a method of using 4-aminotoluene-2-sulfonic acid to modify polyisocyanates is provided, said modified polyisocyanates can be dissolved in water very easily after neutralization. However, it is required in said method to use a certain amount of polyethers, which results in the decrease of the water-resistance of coating films; besides, the sulfonic acids used comprise benzene ring, which results in the decrease of the property of anti-yellowing of coatings.

In DE4433929A, a preparation of polyisocyanates modified with sulfonic acid using small molecular sulfonic acid (2-hydroxy propane sulfonic acid) and big molecular sulfonic acid (hydroxyl-terminated polyether sulfonic acid, such as the Tegomer series products) is provided, after ionization, said modified polyisocyanates can be well dispersed in water. However, 2-hydroxy propane sulfonic acid used herein is carcinogenic, and special big molecular sulfonates are generally provided in the form of sodium salts in industry, because a sulfonic acid neutralized by a strong base is poorly compatible with the other component in a two-component coating, resulting in an opaque two-component system and inhomogeneous coating. And sodium ion will be left in the coating films and influence the water-resistance of coating films permanently.

In CN1190450C, modified polyisocyanates are prepared using 3-(cyclohexylamino)-propanesulfonic acid and 2-(cyclohexylamino)-ethanesulfonic acid, the obtained modified polyisocyanates can be dispersed in water homogeneously without a high shearing force, and polyisocyanates modified with sulfonates neutralized by tertiary amines possess very good storage stability. However, the reaction time of the preparation of polyisocyanates modified with sulphamic acids of said patent method is long, the types of sulphamic acids that can be used to carry out hydrophilic modifications of polyisocyanates by such a reaction are very limited, only 3-(cyclohexylamino)-propanesulfonic acid and 2-(cyclohexylamino)-ethanesulfonic acid are disclosed, and it is mentioned explicitly that many other sulphamic acids with very similar structures cannot react with polyisocyanates even under more drastic conditions.

SUMMARY OF THE INVENTION

One of the objects of the present invention is to provide a polyisocyanate modified with cycloalkyl substituted sulphamic acid, said polyisocyanate modified with sulphamic acid possesses advantages of good water-dispersity and adequate storage stability, the two-component coatings made by said polyisocyanate modified with cycloalkyl substituted sulphamic acid have long pot life, and the coating films have good properties and advantages of water-resistance and acid-resistance and base-resistance and high gloss.

Another object of the present invention is to provide a preparation method of said polyisocyanate modified with sulphamic acid, and the bias which was mentioned in the background of the invention that other sulphamic acids with similar structures, except 3-(cyclohexyl amino)-propanesulfonic acid and 2-(cyclohexyl amino)-ethanesulfonic acid, cannot react with polyisocyanate, can be overcomed by the process improvement in the invention. The process of the method is easy to operate, thus can shorten the reaction time of sulphamic acid and polyisocyanates and the reaction conditions can be milder.

In order to achieve the objects of the invention, the present invention provides the following technical solutions:

From one aspect, the present invention provides said polyisocyanate modified with sulphamic acid, which is prepared by a reaction of polyisocyanate and sulphamic acid with the formula of

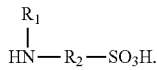

In the formula above, R1 is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, R2 is butyl;

or R1 is one of methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, R2 is propyl;

or R1 is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, R2 is isobutyl;

preferably, R1 is one of cyclohexyl, methyl cyclohexyl, p-methyl cyclohexyl and cycloheptyl, R2 is butyl; or R1 is methyl cyclohexyl, p-methyl cyclohexyl and 3,3,5-trimethyl cyclohexyl, R2 is propyl; or R1 is cyclohexyl and methyl cyclohexyl, R2 is isobutyl.

The amount of said sulphamic acid is 0.5-20 wt %, preferably 1-10 wt % of the total weight of the polyisocyanates and sulphamic acid.

The polyisocyanates modified with sulphamic acid of the present invention possess the following characteristics:
   a) the average functionality of isocyanates is at least 1.8,
   b) the content of isocyanate groups is 4.0-35.0 wt %,
   c) the content of SO3- is 0.1-6.8 wt %,
   and optionally
   d) the content of ethoxy units that bonded to polyether chain is 0-15 wt %, said polyether chain comprises an average ethoxy units of 5-30;

preferably, the polyisocyanates modified with sulphamic acid of the present invention possesses the following characteristics:
   a) the average functionality of isocyanates is 2.0-4.8,
   b) the content of isocyanate groups is 6.0-31.0 wt %,
   c) the content of SO3- is 0.2-4.8 wt %,
   and optionally
   d) the content of ethoxy units that bonded to polyether chain is 4-12 wt %, said polyether chain comprises an average ethoxy units of 10-20.

The polyisocyanates that is used to prepare the polyisocyanates modified with sulphamic acid of the present invention is one or more of aliphatic, alicyclic, aromatic, araliphatic polyisocyanates, and modified polyisocyanates with average functionality of 2.0-5.0 and isocyanate groups content of 7.0-32.0 wt %.

One or more of aliphatic, alicyclic polyisocyanates and modified polyisocyanates with average functionality of 2.0-5.0, isocyanate groups content of 12.0-25.0 wt % are preferred.

The modified polyisocyanates above were prepared by the modification of at least two of simple aliphatic, alicyclic, aromatic and/or araliphatic diisocyanate and comprises uretdione, isocyanurate, allophanate, biuret, iminooxadiazinedione and/or oxadiazinetrione structures. The specific examples can be found in the following patent documents: DE1670666A, DE1954093A, DE2414413A, DE2452532A, DE2641380A, DE3700209A, DE3900053A, DE3928503A, EP0336205A, EP0339396A and EP0798299A etc.;

Isocyanurate groups comprising modified polyisocyanates that are based on one or more of 1,6-hexamethylene diisocyanate (HDI), isophorone diisocyanate (IPDI) and 4,4'-dicyclohexyl methane diisocyanate (H12MDI) are more preferred.

Suitable diisocyanates for the preparation of the above modified polyisocyanates comprising uretdione, isocyanurate, allophanate, biuret, iminooxadiazinedione and/or oxadiazinetrione structures are those that can be obtained by phosgene method or phosgene-free method, for example by a thermal cleavage of urethane. Preferred diisocyanates are those with molecular weight of 100-500 with aliphatically, cycloaliphatically, araliphatically and/or aromatically bonded isocyanate groups, such as 1,4-diisocyanate butane, 1,6-hexamethylene diisocyanate (HDI), 2-methyl-1,5-diisocyanate pentane, 1,5-diisocyanate-2,2-dimethyl pentane, 2,2,4- and 2,4,4-trimethyl-1,6-diisocyanate hexane, 1,10-diisocyanate decane, 1,3- and 1,4-diisocyanate hexane, 1,3- and 1,4-bis(isocyanatemethyl)-cyclohexane, isophorone diisocyanate (IPDI), 4,4'-dicyclohexyl methane diisocyanate (H12MDI), 1-isocyanate-1-methyl-4(3)-isocyanate-methyl-cyclohexane, bis(isocyanatemethyl)-norbornane, 1,3- and 1,4-bis(2-isocyanate-propan-2-yl)-benzene (TMXDI), 2,4- and 2,6-diisocyanate toluene (TDI), 2,4'- and 4,4'-diisocyanate diphenylmethane (MDI) and 1,5-diisocyanate naphthalene or a mixture of these diisocyanates.

Besides, water-dispersible diisocyanates (or polyisocyanates) modified with polyethers containing ethoxy units can also be used as the source of polyisocyanates.

The polyisocyanates modified with sulphamic acids of the present invention can be prepared at the presence of monohydric polyether, the number-average molecular weight is 300-1000, preferably 400-800, the number of the ethoxy units is 5-30, preferably 10-20.

In the present invention, the starting component that can be used in the preparation of said polyether can be: a saturated monohydric alcohol, such as methanol, ethanol, propanol isopropanol, butanol, isobutanol, secondary-butyl alcohol, isomeric pentanol, hexanol, octanol, nonanol, decanol, dodecanol, tetradecanol, hexadecanol, cyclohexanol, hydroxylmethyl cyclohexane and 3-ethyl-3-hydroxylmethyl oxetane; unsaturated alcohols, such as, allyl alcohols, 1,1-dimethyl-allyl alcohols or oleyl alcohol; aromatic alcohols, such as phenols, isomeric methylphenol or metoxyphenol; aralipatic alcochols, such as benzyl alcohol, anisyl alcohol or cinnamyl alcohol; secondary monoamines, such as dimethyl amine, diethyl amine, dipropyl amine, diisopropyl amine, dibutyl amine, diisobutyl amine, bis(2-ethylhexyl)-amine, N-methyl- and N-ethyl-cyclohexyl amine or dicyclohexyl amine; heterocyclic secondary amine, such as morpholine, pyrrolidine, piperidine ethyl pyrazol etc.; a preferred starting component is a saturated monohydric alcohol with at most 4 carbons, methanol is especially preferred as an starting component.

The polymeric monomers are one or two of propylene oxide and ethylene oxide, wherein the amount of ethylene oxide is at least 40 mol %, preferably at least 50 mol %, based on the total moles of the polymeric monomers.

The monohydric polyether is optionally co-used to prepare the polyisocyanates modified with sulphamic acid of the present invention, the content of the ethoxy units bonded to the monohydric polyether chain in the modified polyisocyanates is 0-15 wt %, preferably 4-12 wt %, based on the total weight of the polyisocyanate, sulphamic acid and polyether.

In another aspect, the present invention provides a preparation method of polyisocyanates modified with sulphamic acid, said method comprises: the reaction of polyisocyanates with sulphamic acid with the formula of

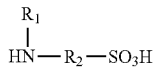

at the presence of tertiary amines.

In the formula above, R1 is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, R2 is butyl;

or R1 is one of methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, R2 is propyl;

or R1 is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, R2 is isobutyl;

Preferably, R1 is one of cyclohexyl, methyl cyclohexyl, p-methyl cyclohexyl and cycloheptyl, R2 is butyl; or R1 is one of methyl cyclohexyl, p-methyl cyclohexyl and 3,3,5-trimethyl cyclohexyl, R2 is propyl; or R1 is one of cyclohexyl and methyl cyclohexyl, R2 is isobutyl.

Optionally, the method of the present invention is carried out under the presence of polyether that comprises ethoxy units, and/or the used polyisocyanate already comprises ethoxy polyether units.

In the method of the present invention, said polyisocyanates are applied through two-step adding process, wherein the first portion of polyisocyanates are mixed with sulphamic acid, tertiary amine and optional polyether, then react for 3-5 h at 95-110° C., then the rest portion of polyisocyanates are added. After cooling to room temperature, polyisocyanates modified with sulphamic acid are obtained; wherein the first portion of polyisocyanates represent 30-90 wt %, preferably 50-80 wt % of the total weight of the polyisocyanates.

The amount of said sulphamic acid is 0.5-20 wt %, preferably 1-10 wt % of the total weight of the polyisocyanates and sulphamic acid.

In the method of the present invention, the polyisocyanates that are used to prepare the polyisocyanates modified with suphamic acid of the present invention are one or more of aliphatic, alicyclic, aromatic, araliphatic polyisocyanates with average functionality of 2.0-5.0 and isocyanate groups content of 7.0-32.0 wt %

One or more of the aliphatic, alicyclic polyisocyanates and modified polyisocyanates with average functionality of 2.0-5.0, isocyanate groups content of 12.0-25.0 wt % are preferred.

The modified polyisocyanates above can be polyisocyanates which were prepared by the modification of at least two of simple aliphatic, alicyclic, aromatic and/or araliphatic diisocyanate and comprise uretdione, isocyanurate, allophanate, biuret, iminooxadiazinedione and/or oxadiazinetrione structures, the specific examples can be found in the following patent documents: DE1670666A, DE1954093A, DE2414413A, DE2452532A, DE2641380A, DE3700209A, DE3900053A, DE3928503A, EP0336205A, EP0339396A and EP0798299A etc.;

Suitable diisocyanates for the preparation of the above polyisocyanates comprising uretdione, isocyanurate, allophanate, biuret, iminooxadiazinedione and/or oxadiazinetrione structures are those that can be obtained by phosgene method or phosgene-free processes, for example by a thermal cleavage of urethane. Preferred diisocyanates are those with molecular weight of 100-500 with aliphatically, cycloaliphatically, araliphatically and/or aromatically bonded isocyanate groups, such as 1,4-diisocyanate butane, 1,6-hexamethylene diisocyanate (HDI), 2-methyl-1,5-diisocyanate pentane, 1,5-diisocyanate-2,2-dimethyl pentane, 2,2,4- and 2,4,4-trimethyl-1,6-diisocyanate hexane, 1,10-diisocyanate decane, 1,3- and 1,4-diisocyanate hexane, 1,3- and 1,4-bis (isocyanatemethyl)-cyclohexane, isophorone diisocyanate (IPDI), 4,4'-dicyclohexyl methane diisocyanate (H12MDI), 1-isocyanate-1-methyl-4(3)-isocyanate-methylcyclohexane, bis(isocyanatemethyl)-norbornane, 1,3- and 1,4-bis(2-isocyanate-propan-2-yl)-benzene (TMXDI), 2,4- and 2,6-diisocyanate toluene (TDI), 2,4'- and 4,4'-diisocyanate diphenylmethane (MDI) and 1,5-diisocyanate naphthalene or a mixture of these diisocyanates.

Isocyanurate groups-containing modified polyisocyanates that are based on one or more of 1,6-hexamethylene diisocyanate (HDI), isophorone diisocyanate (IPDI) and 4,4'-dicyclohexyl methane diisocyanate (H12MDI) are more preferred.

Besides, water-dispersible diisocyanates (or polyisocyanates) modified with polyethers containing ethoxy units can also be used as the source of polyisocyanates.

In the method of the present invention, said polyether is monohydric polyethers, the number-average molecular weight is 300-1000, preferably 400-800, the number of the ethoxy units is 5-30, preferably 10-20.

The starting component that can be used in the preparation of the polyether of the method of the present invention can be: a saturated monohydric alcohol, such as methanol, ethanol, propanol isopropanol, butanol, isobutanol, secondary butyl alcohol, isomeric pentanol, hexanol, octanol, nonanol, decanol, dodecanol, tetradecanol, hexadecanol, cyclohexanol, hydroxylmethyl cyclohexane and 3-ethyl-3-hydroxylmethyl oxetane; unsaturated alcohols, such as, allyl alcohols, 1,1-dimethyl-allyl alcohols or oleyl alcohol; aromatic alcohols, such as phenols, isomeric methylphenol or metoxyphenol; araliphatic alcochols, such as benzyl alcohol, anisyl alcohol or cinnamyl alcohol; secondary monoamines, such as dimethyl amine, diethyl amine, dipropyl amine, diisopropyl amine, dibutyl amine, diisobutyl amine, bis(2-ethylhexyl)-amine, N-methyl- and N-ethyl-cyclohexyl amine or dicyclohexyl amine; heterocyclic secondary-amine, such as morpholine, pyrrolidine, piperidine ethyl pyrazol etc.

Preferred starting component is a saturated monohydric alcohol with at most 4 carbons, methanol is especially preferred.

The polymeric monomers are one of more of propylene oxide and ethylene oxide, wherein the amount of ethylene oxide is at least 40 mol %, preferably at least 50 mol %, based on the total moles of the polymeric monomers.

In the method of the present invention, monohydric polyether is optionally co-used to prepare the polyisocyanates modified with suphamic acid of the present invention, the content of the ethoxy units bonded to the monohydric polyether chain in the modified polyisocyanate is 0-15 wt %, preferably 4-12 wt %, based on the total weight of the polyisocyanate, suphamic acid and polyether.

In the method of the present invention, said tertiary amine is aliphatic and/or alicyclic substituted, non-cyclic and/or cyclic tertiary amine, comprising tertiary monoamines, such as trimethylamine, triethylamine, tripropylamine, dimethyl cyclohexyl amine, N-methylmorpholine, N-methylquinoline, N-ethylquinoline etc.; or tertiary diamine, such as 1,3-bis-(dimethylamino)-propane and N,N-dimethylpiperazine etc.; one or more of triethylamine, dimethyl cyclohexyl amine and N-methylmorpholine are preferred.

In the method of the present invention, the molar ratio of said tertiary amine to the SO3- group of sulphamic acid is 0.2-2.0:1, preferably 0.5-1.5:1.

In the method of the present invention, the molar ratio of isocyanate groups and groups which are reactive towards isocyanate groups is kept to 4-300:1, the molar ratio of isocyanate groups and groups which are reactive groups towards isocyanate is kept to 6-200:1.

In the method of the present invention, in one aspect, said tertiary amine is used to neutralize the sulfonic acid group in sulphamic acid to form sulfonate, in another aspect, said tertiary amine is used as phase transition catalyst of the reaction of polyisocyanates and sulphamic acid.

Said tertiary amine can also be used in combination with the catalysts that are commonly used in polyurethane chemistry, such as pyridine, methylpyridine, benzyl dimethyl amine, N,N-dimethyl piperazine; organic metal catalysts: tri(ethyl-acetyl acetate) aluminum, tin octoate, zinc octoate, 2-ethyl-1-tin(II) hexanoate, dibutyl tin(IV) dichloride, dibutyl tin(IV) diacetate, dibutyl tin(IV) dilaurate, dioctyl tin(IV) diacetate or molybdenum glycollate, or any desired mixtures of such catalysts. And the amount of use of these common catalysts is 10-2000 ppm, preferably 100-500 ppm of the total weight of the reaction material.

In the method of the present invention, under the presence of tertiary amine, polyisocyanates and sulphamic acid can be chosen to react in solvents which are inert towards isocyanate groups, such as one of or a mixture of more of the solvents: acetone, butanone, cyclopentanone ethyl acetate, butyl acetate, N-ethyl pyrrolidone, N-methyl pyrrolidone, toluene, xylene, chlorobenzene, propylene glycol methyl ether acetate, 1-methoxylprop-2-yl acetate, 3-methoxyl-butyl acetate, aromatic compound (such as Solvesso®, Isopar®, Nappar® named after solvent oil), dimethyl carbonate, diethyl carbonate, butyrolactone, caprolactone and methyl caprolactone etc.

It is revealed that, according to the process described in CN1190450C, said sulphamic acid (such as cyclohexylamino butane sulfonic acid, cyclohexylmethylamino propane sulfonic acid, 4-methylcyclohexylamino propane sulfonic acid etc.) of the present invention does not react with polyisocyanates at 80° C., even when the reaction temperature is increased to 110° C., plenty of suspended solids are left after 10 hours of reaction. It is mainly because the molecular structure difference between said sulphamic acid used in the present invention and cyclohexylamino propane sulfonic acid and cyclohexylamino ethane sulfonic acid, results in the decrease of reaction activity. Said sulphamic acid mentioned cannot react with polyisocyanates in the common synthesizing process system. Even under more drastic conditions by increasing temperature, a large amount of suspended solids will be left. These results comply with the opinion described in CN1190450C that "many other sulphamic acids with very similar structures cannot react with polyisocyanates even under more drastic conditions".

In another aspect, surprisingly, it is revealed that if unmodified polyisocyanates are added through two-step adding process, i.e. polyisocyanates are divided into two portions, wherein the first portion reacts with the cycloalkyl substituted-sulphamic acid of the present invention completely, then the rest of polyisocyanate are added to mix. The overall reaction can be completed within 3-5 hours, transparent modified polyisocyanate that is stable for storage can be obtained finally. And the less the proportion of the first portion of polyisocyanates is, the faster the reaction rate is.

Polyisocyanates are not compatible with the sulphamic acid monomer (such as cyclohexyl amino butane sulfonic acid, cyclohexylmethylamino propane sulfonic acid, 4-methylcyclohexylamino propane sulfonic acid) of the present invention. The reactants are divided into two phases in the reaction system, i.e. solid sulphamic acid monomer phase and liquid polyisocyanates phase. So the reaction is typical heterogeneous reaction, which means very slow reaction rate or even no reaction. Suitable phase transition catalysts make the heterogeneous systems that originally have a very slow reaction rate or even have no reaction react easily. The concentration of the catalysts (based on the total weight of the reaction materials) directly determine the reaction rate.

After a lot of studies, it is revealed that tertiary amines do not only have a very good compatibility with polyisocyanates, but also have a certain compatibility for sulphamic acid monomers, which complies with the characteristics of phase transition catalysts. Therefore, tertiary amines in the system do not only play the role of neutralizing agent, but also act as phase transition catalysts. Only through the double roles of tertiary amines can solid sulphamic acid monomer react with unmodified liquid phase polyisocyanates. While without tertiary amines, polyisocyanates do not react with the sulphamic acids of the present invention. It can be concluded that tert-amines are not only neutralizing agents but also phase transition catalysts.

According to the present invention, the concentration of the phase transition catalysts (tertiary amines) in the first step of the new two-step adding process is more than that in common process, which results in an increased reaction rate and shorter reaction time. While the lower the ratio of the polyisocyanates used in the first step represent in the total polyisocyanates is, the higher the concentration of the phase transition catalysts (tertiary amines) is, and the faster the reaction rate is. Theoretically, under common one-step process, increase of the concentration of tertiary amine simultaneously can also shorten reaction time. But the higher the concentration of the tertiary amine added is, the higher the concentration of tertiary amine left in the system after the reaction is completed is, which will decrease the storage stability of modified polyisocyanates. Therefore, by the new two-step adding process provided in the present invention, the sulphamic acid monomer that react even hardly can react with polyisocyanates, modified polyisocyanates that can self-emulsify in water can be prepared without adding emulsifying agent and high-speed shear forces. Moreover, such modified polyisocyanates are prepared easily. The raw materials are not much toxic, and neutralizing agents (phase transition catalysts) can be chosen freely, modified isocyanates that are well compatible with common water-dipersible hydroxyl polyurethane are obtained.

The cycloalkyl substituted sulphamic acids provided in the present invention enrich the kinds of sulphamic acid that can be used in the hydrophilic modification of polyisocyanates.

In addition, compared with surfactant molecules formed by using the reaction of sulphamic acid and polyisocyanate provided in CN1190450C, surfactant molecules owns larger hydrophobic groups that was obtained by the reaction of the suphamic acid possessing larger space structure with polyisocyanates. It means a lower critical micelle concentration in water, better emulsifying ability and better film performance of the two-component coating applied in water-dispersible hydroxyl dispersions, and better water-resistance and base-resistance performances. Moreover, compared with the modified polyisocyanate prepared in CN1190450C, the modified polyisocyanate prepared by the two-step adding process in the patent own longer pot life while used in two-component coating system (about 4 hours).

According to another aspect of the present invention, the present invention also provides said polyisocyanate modified with sulphamic acid and the use of the modified polyisocyanates as starting components in the water-dispersible synthesized polyurethane, especially the use as cross-linking agents in water-dispersible two-component coatings and adhesives.

The polyisocyanates modified with sulphamic acid obtained in the present invention are transparent and colorless (or light yellow), possess good storage stability under ambient temperature and good water dispersibility. The composition was described above. Moreover, said polyisocyanates modified with suphamic acid possess high average functionality and content of isocyanate. Although, SO3-concentration is low, suphamic acid-modified polyisocyanates in the present invention remain very good dispersibilty. It offers great advantages in the application of aqueous two-component coatings. The two-component coatings prepared by the isocyanate modified with sulphamic acids in the present invention have very good performances in solvent-resistance and chemical resistance; the water-resistance is also excellent resulting from low contents of hydrophilic groups.

The polyisocyanates modified with sulphamic acids in the present invention, as cross-linking agents or synthetic partner, can be dispersed and applied in aqueous binding agents, said binding agents comprise groups that are capable of reacting with isocyanates, especially hydroxyl.

The polyisocyanates modified with sulphamic acid in the present invention are used as cross-linking components in coating binders in those amount which correspond to an equivalent molar ratio of isocyanate groups to groups which are reactive towards isocyanate groups of 0.5-2.5:1.0, preferably 0.8-1.8:1; the polyisocyanate modified with sulphamic acid of the present invention can also be admixed to aqueous coating binders in small amount to obtain special properties.

Finally, the present invention also provides that the polyisocyanates modified with suphamic acid can be employed as starting component to prepare water-dispersible blocked polyisocyanates dispersion or blocked polyisocyanates which can be dispersed in water.

The polyisocyanate modified with sulphamic acid of the present invention can also be blocked by a blocking agent, and can be used to prepare modified polyisocyanate emulsion which can be used in single-component systems. Suitable blocking agents are, for example, diethyl malonate, ethyl acetoacetate, 3,5-dimethylpyrazole, imidazole, ε-caprolactam etc or a mixture of these blocking agents.

The polyisocyanates modified with sulphamic acids of the present invention can be dispersed homogeneously in aqueous coatings or binders because of their excellent water dispersibility, which lead to coating films with outstanding optical properties, especially high surface gloss, high flowbility and high transparency.

The polyisocyanates modified with sulphamic acids of the present invention, except used as cross-linking components of two-component coatings and adhesives, can also be very suitable as cross-linking agents in textile finishing, printing coating binders and can be used to cross-link other aqueous dispersions or as auxiliaries for paper humidifying treatment.

Under strong mechanical stirring, stable blue emulsions can be prepared by modified polyisocyanate blocked by blocking agents, which is made to water-dispersible.

DETAILED DESCRIPTION OF THE INVENTION

The present invention will be further illustrated by the following examples, it should be noted that the examples are not the limitations for the extent of protection of the present invention.

Raw Materials

Component a)

Polyisocyanate 1 (Wannate HT-100, Wanhua, Ningbo, polyisocyanates based on HDI, isocyanate groups content of 21.5-22.5 wt %, the average functionality of 3.3-3.8);

Polyisocyanate 2 (Bayer NZ1, polyisocyanate based on HDI and IPDI, isocyanate groups content of 20 wt %, the average functionality of 3.3-3.5);

Component b)

4-(cyclohexyl amino)-butane sulfonic acid: cyclohexylamine and 1,4-butyl sultone, corresponding to an equivalent molar ratio of 3:1, are admixed to dioxane solvent, and then react at 80° C. for 6 h, solids are obtained by washing with acetone until becoming white (for example, see US2007010573 A1);

4-(cyclohexylmethylamino)-butane sulfonic acid: it is prepared by cyclohexanemethylamine and 1,4-butyl sultone according to the above method;

4-(p-methyl cyclohexylamino)-butane sulfonic acid: it is prepared by p-methyl cyclohexaneamine and 1,4-butyl sultone according to the above method;

4-(cycloheptyl)-butane sulfonic acid: it is prepared by cycloheptane and 1,4-butyl sultone according to the above method;

3-(cyclohexylmethylamino)-propane sulfonic acid: it is prepared by cyclohexylmethylamine and 1,3-propane sultone according to the above method;

3-(p-methyl cyclohexyl amino)-propane sulfonic acid: it is prepared by p-methyl cyclohexylamine and 1,3-propane sultone according to the above method;

3-(3,3,5-trimethyl cyclohexyl amino)-propane sulfonic acid: it is prepared by 3,3,5-trimethyl cyclohexyl amine and 1,3-propane sultone according to the above method;

3-(cyclohexyl amino)-2-methyl-1-propane sulfonic acid: it is prepared by cyclohexyl amine and 1,3-butyl sulfone according to the above method;

3-(cyclohexyl methyl amino)-2-methyl-1-propane sulfonic acid: it is prepared by cyclohexyl methyl amine and 1,3-butyl sulfone according to the above method;

Component c)

Monohydric polyether that comprises ethoxy units (GEP-105, Wan hua rong wei, molecular weight of 500-600, an average hydroxyl value of 100-110 mg KOH/g, the number of ethoxyl units of 11-13);

Please be noticed that the following examples are only used to testify the present invention but not to limit the invention. Unless otherwise defined, all the percentages relate to weight percentages.

Example 1

In a round bottom flask with four necks equipped with a mechanical stirrer, a condenser tube, a thermometer and a nitrogen inlet and outlet, 10 g (0.042 mol) 4-(cyclohexyl amino)-butanesulfonic acid, 5.4 g (0.042 mol) dimethyl cyclohexylamine were added to 133 g polyisocyanate 1 (0.70 mol). The reaction lasted for 5 h at 100° C. Then 57 g (0.29 mol) polyisocyanate 1 was added and mixed homogeneously. After cooling to room temperature, the polyisocyanates modified with sulphamic acid with the following characteristic data is obtained:
- solid content: 100%
- isocyanate groups content: 19.3 wt %
- average isocyanate groups functionality: 3.4
- viscosity (25° C.): 5000 mPa·s
- SO3- content: 1.65 wt %
- ethoxyl unit content: 0

Example 2

In a round bottom flask with four necks equipped with a mechanical stirrer, a condenser tube, a thermometer and a nitrogen inlet and outlet, 10 g (0.042 mol) 4-(cyclohexyl amino)-butanesulfonic acid, 5.4 g (0.042 mol) dimethyl cyclohexylamine were added to 95 g polyisocyanate 1 (0.50 mol). The reaction lasted for 3 h at 100° C. Then 95 g (0.50 mol) polyisocyanate 1 was added and mixed homogeneously. After cooling to room temperature, the polyisocyanate modified with sulphamic acid with the following characteristic data is obtained:
- solid content: 100%
- isocyanate groups content: 19.3 wt %
- average isocyanate groups functionality: 3.4
- viscosity (25° C.): 5000 mPa·s
- SO3- content: 1.65 wt %
- ethoxyl unit content: 0

Example 3

In a round bottom flask with four necks equipped with a mechanical stirrer, a condenser tube, a thermometer and a nitrogen inlet and outlet, 2 g (0.008 mol) 4-(cyclohexyl amino)-butanesulfonic acid, 1.08 g (0.008 mol) dimethyl cyclohexylamine were added to 138 g polyisocyanate 1 (0.73 mol). The reaction lasted for 5 h at 100° C. Then 60 g (0.32 mol) polyisocyanate 1 was added and mixed homogeneously. After cooling to room temperature, the polyisocyanate modified with sulphamic acid with the following characteristic data is obtained:
- solid content: 100%
- isocyanate groups content: 21.2 wt %
- average isocyanate groups functionality: 3.5
- viscosity (25° C.): 3500 mPa·s
- SO3- content: 0.33 wt %
- ethoxyl unit content: 0

Example 4

In a round bottom flask with four necks equipped with a mechanical stirrer, a condenser tube, a thermometer and a nitrogen inlet and outlet, 20 g (0.084 mol) 4-(cyclohexyl amino)-butanesulfonic acid, 10.8 g (0.084 mol) dimethyl cyclohexylamine were added to 126 g polyisocyanate 1 (0.69 mol). The reaction lasted for 5 h at 100° C. Then 54 g (0.30 mol) polyisocyanate 1 was added and mixed homogeneously. After cooling to room temperature, the polyisocyanate modified with sulphamic acid with the following characteristic data is obtained:
- solid content: 100%
- isocyanate groups content: 17.0 wt %
- average isocyanate groups functionality: 3.2
- viscosity (25° C.): 6300 mPa·s
- SO3- content: 3.23 wt %
- ethoxyl unit content: 0

Example 5

In a round bottom flask with four necks equipped with a mechanical stirrer, a condenser tube, a thermometer and a nitrogen inlet and outlet, 10 g (0.042 mol) 4-(cyclohexyl amino)-butanesulfonic acid, 5.4 g (0.042 mol) dimethyl cyclohexylamine, 22.8 g (0.041 mol) monohydric polyether GEP-105 were added to 133 g polyisocyanate 1 (0.70 mol). The reaction lasted for 5 h at 100° C. Then 57 g (0.29 mol) polyisocyanate 1 was added and mixed homogeneously. After cooling to room temperature, the polyisocyanate modified with sulphamic acid with the following characteristic data is obtained:
- solid content: 100%
- isocyanate groups content: 16.6 wt %
- average isocyanate groups functionality: 3.3
- viscosity (25° C.): 5700 mPa·s
- SO3- content: 1.48 wt %
- ethoxyl unit content: 9.4 wt %

Example 6

In a round bottom flask with four necks equipped with a mechanical stirrer, a condenser tube, a thermometer and a nitrogen inlet and outlet 10 g (0.042 mol) 4-(cyclohexyl amino)-butanesulfonic acid, 5.4 g (0.042 mol) dimethyl cyclohexylamine, 28 g (0.050 mol) monohydric polyether GEP-105 were added to 133 g polyisocyanate 1 (0.70 mol). The reaction lasted for 5 h at 100° C. Then 57 g (0.29 mol) polyisocyanate 1 was added and mixed homogeneously. After cooling to room temperature, the polyisocyanate modified with sulphamic acid with the following characteristic data is obtained:
- solid content: 100%
- isocyanate groups content: 16.0 wt %
- average isocyanate groups functionality: 3.1
- viscosity (25° C.): 3700 mPa·s
- SO3- content: 1.43 wt %
- ethoxyl unit content: 11.3

Example 7

In a round bottom flask with four necks equipped with a mechanical stirrer, a condenser tube, a thermometer and a nitrogen inlet and outlet, 10 g (0.084 mol) 4-(cyclohexyl amino)-butanesulfonic acid, 5.4 g (0.084 mol) dimethyl cyclohexylamine, 51.4 g propylene glycol methyl ether acetate were added to 133 g polyisocyanate 1 (0.90 mol). The reaction lasted for 3 h at 100° C. Then 57 g (0.29 mol) polyisocyanate 1 was added and mixed homogeneously. After cooling to room temperature, the polyisocyanate modified with sulphamic acid with the following characteristic data is obtained:

solid content: 80%
isocyanate groups content: 15.2 wt %
average isocyanate groups functionality: 3.4
viscosity (25° C.): 1200 mPa·s
SO3- content: 1.32 wt %
ethoxyl unit content: 0

Example 8

In a round bottom flask with four necks equipped with a mechanical stirrer, a condenser tube, a thermometer and a nitrogen inlet and outlet, 10 g (0.084 mol) 4-(cyclohexyl amino)-butanesulfonic acid, 5.4 g (0.084 mol) dimethyl cyclohexylamine were added to 133 g polyisocyanate 2 (0.63 mol). The reaction lasted for 3 h at 100° C. Then 57 g (0.27 mol) polyisocyanate 2 was added and mixed homogeneously. After cooling to room temperature, the polyisocyanate modified with sulphamic acid with the following characteristic data is obtained:
solid content: 100%
isocyanate groups content: 17.6 wt %
average isocyanate groups functionality: 3.4
viscosity (25° C.): 4800 mPa·s
SO3- content: 1.65 wt %
ethoxyl unit content: 0

Example 9

10 g (0.042 mol) 3-(cyclohexyl methyl amino)-propanesulfonic acid was applied to replace the 10 g (0.042 mol) 4-(cyclohexyl amino)-butanesulfonic acid in example 1, the rest of items can be referred to example 1, the polyisocyanate modified with sulphamic acid with the following characteristic data is obtained:
solid content: 100%
isocyanate groups content: 19.2 wt %
average isocyanate groups functionality: 3.4
viscosity (25° C.): 4700 mPa·s
SO3- content: 1.65 wt %
ethoxyl unit content: 0

Example 10

10 g (0.042 mol) 3-(p-methyl cyclohexyl amino)-propanesulfonic acid was used to replace the 10 g (0.042 mol) 4-(cyclohexyl amino)-butanesulfonic acid in example 1, the rest of items can be referred to example 1, the polyisocyanate modified with sulphamic acid with the following characteristic data is obtained:
solid content: 100%
isocyanate groups content: 19.3 wt %
average isocyanate groups functionality: 3.3
viscosity (25° C.): 5000 mPa·s
SO3- content: 1.65 wt %
ethoxyl unit content: 0

Example 11

10 g (0.038 mol) 3-(3,3,5-trimethyl cyclohexyl amino)-propanesulfonic acid and 4.8 g (0.038 mol) dimethyl cyclohexylamine were used to replace the 10 g (0.042 mol) 4-(cyclohexyl amino)-butanesulfonic acid and 5.4 g (0.042 mol) dimethyl cyclohexylamine in example 1, the rest of items can be referred to example 1, the polyisocyanate modified with sulphamic acid with the following characteristic data is obtained:
solid content: 100%
isocyanate groups content: 19.4 wt %
average isocyanate groups functionality: 3.4
viscosity (25° C.): 4500 mPa·s
SO3- content: 1.44 wt %
ethoxyl unit content: 0

Example 12

10 g (0.040 mol) 4-(p-methyl cyclohexyl amino)-butanesulfonic acid and 5.1 g (0.040 mol) dimethyl cyclohexylamine were used to replace the 10 g (0.042 mol) 4-(cyclohexyl amino)-butanesulfonic acid and 5.4 g (0.042 mol) dimethyl cyclohexylamine of example 1, the rest of items can be referred to example 1, the polyisocyanate modified with sulphamic acid with the following characteristic data is obtained:
solid content: 100%
isocyanate groups content: 19.2 wt %
average isocyanate groups functionality: 3.4
viscosity (25° C.): 4900 mPa·s
SO3- content: 1.57 wt %
ethoxyl unit content: 0

Example 13

10 g (0.040 mol) 4-(cycloheptyl amino)-butanesulfonic acid and 5.1 g (0.040 mol) dimethyl cyclohexylamine were used to replace the 10 g (0.042 mol) 4-(cyclohexyl amino)-butanesulfonic acid and 5.4 g (0.042 mol) dimethyl cyclohexylamine in example 1, the rest of items can be referred to example 1, the polyisocyanate modified with sulphamic acid with the following characteristic data is obtained:
solid content: 100%
isocyanate groups content: 19.0 wt %
average isocyanate groups functionality: 3.4
viscosity (25° C.): 4800 mPa·s
SO3- content: 1.57 wt %
ethoxyl unit content: 0

Example 14

10 g (0.040 mol) 4-(cyclohexyl methyl amino)-butanesulfonic acid and 5.1 g (0.040 mol) dimethyl cyclohexylamine were used to replace the 10 g (0.042 mol) 4-(cyclohexyl amino)-butanesulfonic acid and 5.4 g (0.042 mol) dimethyl cyclohexylamine in example 1, the rest of items can be referred to example 1, the polyisocyanate modified with sulphamic acid with the following characteristic data is obtained:
solid content: 100%
isocyanate groups content: 19.4 wt %
average isocyanate groups functionality: 3.4
viscosity (25° C.): 4700 mPa·s
SO3- content: 1.57 wt %
ethoxyl unit content: 0

Example 15

10 g (0.042 mol) 3-(cyclohexyl amino)-2-methyl-1-propanesulfonic acid was used to replace the 10 g (0.042 mol) 4-(cyclohexyl amino)-butanesulfonic acid in example 1, the rest of items can be referred to example 1, the polyisocyanate modified with sulphamic acid with the following characteristic data is obtained:
solid content: 100%
isocyanate groups content: 19.2 wt %
average isocyanate groups functionality: 3.4 viscosity (25° C.): 5100 mPa·s
SO3- content: 1.65 wt %
ethoxyl unit content: 0

Example 16

10 g (0.040 mol) 3-(cyclohexyl methyl amino)-2-methyl-1-propanesulfonic acid and 5.1 g (0.040 mol) dimethyl cyclohexylamine were used to replace the 10 g (0.042 mol) 4-(cyclohexyl amino)-butanesulfonic acid and 5.4 g (0.042 mol) dimethyl cyclohexylamine in example 1, the rest of items can be referred to example 1, the polyisocyanate modified with sulphamic acid with the following characteristic data is obtained:
    solid content: 100%
    isocyanate groups content: 19.3 wt %
    average isocyanate groups functionality: 3.4
    viscosity (25° C.): 5000 mPa·s
    SO3- content: 1.64 wt %
    ethoxyl unit content: 0

Example 17

2.7 g (0.021 mol) dimethyl cyclohexylamine was used to replace the 5.4 g (0.042 mol) dimethyl cyclohexylamine in example 1, and the reaction time was prolonged to 6 h, the rest of items can be referred to example 1, the polyisocyanate modified with sulphamic acid with the following characteristic data is obtained:
    solid content: 100%
    isocyanate groups content: 19.3 wt %
    average isocyanate groups functionality: 3.4
    viscosity (25° C.): 4900 mPa·s
    SO3- content: 1.65 wt %
    ethoxyl unit content: 0

Example 18

8.1 g (0.063 mol) dimethyl cyclohexylamine was used to replace the 5.4 g (0.042 mol) dimethyl cyclohexylamine in example 1, the rest of items can be referred to example 1, the polyisocyanate modified with sulphamic acid with the following characteristic data is obtained:
    solid content: 100%
    isocyanate groups content: 19.1 wt %
    average isocyanate groups functionality: 3.4
    viscosity (25° C.): 4700 mPa·s
    SO3- content: 1.65 wt %
    ethoxyl unit content: 0

Comparative Example 1

In a round bottom flask with four necks equipped with a mechanical stirrer, a condenser tube, a thermometer and a nitrogen inlet and outlet, 10 g (0.042 mol) 4-(cyclohexyl amino)-butanesulfonic acid, 5.4 g (0.042 mol) dimethyl cyclohexylamine were added to 190 g polyisocyanate 1 (0.99 mol). The reaction lasted for 20 h at 80° C. the reaction system was cloudy, which indicated that under said temperature, 4-(cyclohexylamino)-butanesulfonic acid did not react with polyisocyanates.

Comparative Example 2

In a round bottom flask with four necks equipped with a mechanical stirrer, a condenser tube, a thermometer and a nitrogen inlet and outlet, 10 g (0.042 mol) 4-(cyclohexyl amino)-butanesulfonic acid, 5.4 g (0.042 mol) dimethyl cyclohexylamine were added to 190 g polyisocyanate 1 (0.99 mol). The reaction lasted for 10 h at. There's still a large amount of suspensions in the system, which means 4-(cyclohexylamino)-butanesulfonic acid could hardly react with polyisocyanates under such conditions.

Comparative Example 3

In a round bottom flask with four necks equipped with a mechanical stirrer, a condenser tube, a thermometer and a nitrogen inlet and outlet, 10 g (0.042 mol) 4-(cyclohexyl amino)-butanesulfonic acid was added to 190 g polyisocyanate 1 (0.99 mol). The reaction lasted for 10 h at 110° C. The system was cloudy, which indicated that 4-(cyclohexylamino)-butanesulfonic acid did not react with polyisocyanates without the presence of tertiary amine.

Comparative Example 4

In a round bottom flask with four necks equipped with a mechanical stirrer, a condenser tube, a thermometer and a nitrogen inlet and outlet, 10 g (0.084 mol) 3-(cyclohexyl amino)-propanesulfonic acid, 5.4 g (0.084 mol) dimethyl cyclohexylamine were added to 190 g polyisocyanate 1 (0.99 mol). The reaction lasted for 10 h at 80° C. After cooling to room temperature, the polyisocyanates modified with sulphamic acid with the following characteristic data is obtained:
    solid content: 100%
    isocyanate groups content: 19.2 wt %
    average isocyanate groups functionality: 3.4
    viscosity (25° C.): 4600 mPa·s
    SO3- content: 1.76 wt %
    ethoxyl unit content: 0

Comparative Example 5

10 g 2-methylamino ethanesulfonic acid (0.08 mol) and 10.16 g dimethyl cyclohexylamine (0.08 mol) were used to replace the 10 g (0.042 mol) 4-(cyclohexyl amino)-butanesulfonic acid and the 5.4 g (0.042 mol) dimethyl cyclohexylamine in example 1, the rest of items can be referred to example 1. The reaction mixture was heated to 100° C. for 6 h. The system was turbid. Even the temperature was increased to 120° C., and a further reaction for 4 h, the system was still cloudy, which indicated that the 2-methylamino ethanesulfonic acid did not react with polyisocyanates and was present in the form of crystals in the system.

Example 19

The Application in Aqueous Two-Component Coatings 47.12 g hydroxyl-acrylic resin (Antkote® 2033) with hydroxyl value of 3.3, solid content of 46%, pH of 7.5-8.0, 0.6 g wetting agent (Surfynol 104BC), 2.22 g dispersing agent (Borchi® Gen SN 95), 0.16 g levelling agent (Baysilone Paint Additive 3468) diluted to 10% by ethyleneglycol butyl ether, 27.65 g titanium white and 7.06 g deionized water were mixed and then grinded to fineness of less than 20 µm. Then 14.2 g polyisocyanates modified with sulphamic acids according to the invention from said examples or the comparative examples were added. The obtained two-component mixture was applied on different substrates and dried for 30 min at 80° C. after being dried on the surface. The coating films with properties shown in the table 1 below were obtained.

TABLE 1

Properties of the coating films

| Sulphamic acid modified polyisocyanate | Example 1 | Example 6 | Example 9 | Example 10 | Example 11 | Example 12 | Example 13 | Example 14 | Example 16 | Comparative example 4 |
|---|---|---|---|---|---|---|---|---|---|---|
| Processing time | 4 h | 4 h | 4 h | 4 h | 4 h | 4 h | 4 h | 4 h | 4 h | 3.5 h |
| Pendulum-rocker hardness* (k), s | 137 | 132 | 145 | 136 | 137 | 132 | 132 | 132 | 134 | 130 |
| Pencil hardness* (Mitsubish, scratch) | ≥H | ≥H | ≥H | ≥H | ≥H | ≥H | ≥H | ≥H | ≥H | ≥H |
| Gloss* (20°/60°), % | 74/89 | 78/85 | 76/82 | 78/81 | 75/89 | 72/83 | 72/83 | 72/83 | 70/89 | 73/88 |
| Impact* (1 kg), cm | 50 | 50 | 62 | 52 | 56 | 52 | 52 | 52 | 54 | 54 |
| flexibility**, mm | 0.5 | 0.5 | 0.5 | 0.5 | 0.5 | 0.5 | 0.5 | 0.5 | 0.5 | 0.5 |
| adhesion** (cross-hatching) | 0-1 degree | 0-1 degree | 0-1 degree | 0-1 degree | 0-1 degree | 0-1 degree | 0-1 degree | 0-1 degree | 0-1 degree | 0-1 degree |
| Deionized water resistance, no change | 96 h | 90 h | 96 h | 84 h | 84 h | 88 h | 86 h | 90 h | 90 h | 72 h |
| Acid resistance/5% sulfuric acid, 24 h | No change | No change | No change | No change | No change | No change | No change | No change | No change | No change |
| Base resistance/5% sodium hydroxide, no change | 8 h | 8 h | 7 h | 8 h | 8 h | 7 h | 8 h | 8 h | 7 h | 6 h |
| Salt water resistance/5% sodium chloride, 72 h | No change | No change | No change | No change | No change | No change | No change | No change | No change | No change |
| Fog-corrosion retardancy*** | /5% Sodium chloride, 5 d | pass | pass | pass | pass | pass | pass | pass | pass | pass |

PS: standard of adhesion: 0 (very good)-5 (poor)
*substrates of glass panels, tested condition of 25° C. and 50% RH, the wet film thickness of 100 μm
**substrates of tinplates, the dry film thickness of 40 μm
***substrates of carbon steel, the dry film thickness of 40 μm The data showed that, compared with the sulphamic acid modified polyisocyanate according to comparative example 4, the sulphamic acid modified polyisocyanates according to other examples through two-step adding process possess longer processing time in the two-component coating system, and the two-component coating films possess better water-resistance and base resistance.

Example 20

Preparation of Blocked Modified Polyisocyanates

In a round bottom flask with four necks equipped with a mechanical stirrer, a condenser tube, a thermometer and a nitrogen inlet and outlet, 12.5 g (0.053 mol) 4-(cyclohexyl amino)-butanesulfonic acid, 6.8 g (0.053 mol) dimethyl cyclohexylamine were added to 166 g (0.87 mol) polyisocyanate 1. The reaction lasted for 3 h at 100° C. Then 71 g (0.37 mol) polyisocyanate 1 was added and mixed homogeneously. Because the viscosity of the reaction system was relative high, 64.7 g N-ethyl-pyrrolidone was added to dilute the mixture at 60-70° C. 114 g (1.19 mol) the blocking agent 3,5-dimethylpyrazole was added in the course of 0.5 h, until the NCO content of the system was lower than 0.1 wt %, the blocked polyisocyanates modified with suphamic acid was obtained.

Under vigorous mechanical stirring conditions, 200 g deionized water was added slowly to the above 200 g blocked sulphamic acid modified polyisocyanate, stable white emulsions with blue light was prepared.

solid content: 40 wt %
particle size (nm): 89
blocked isocyanate groups content (based on the emulsion): 5.7 wt %
viscosity (25° C.): 210 mPa·s
solvent content: 6.9 wt %

The invention claimed is:
1. A polyisocyanate modified with sulphamic acid, which is prepared by a reaction of a polyisocyanate and a sulphamic acid with the formula of

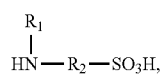

wherein in the reaction, the polyisocyanate is added through a two-step adding process, wherein a first portion of the polyisocyanate is mixed with the sulphamic acid, a tertiary amine and optionally a polyether, and the reaction lasts 3-5 h at 95-110° C., then the rest of the polyisocyanate is added, after cooling to room temperature, the polyisocyanate modified with sulphamic acid is obtained; wherein the first portion of the polyisocyanate represents 30-90 wt % of the total weight of the polyisocyanate,
wherein $R_1$ is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, $R_2$ is butyl;
or $R_1$ is one of methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, $R_2$ is propyl;
or $R_1$ is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, $R_2$ is isobutyl; and
wherein the amount of said sulphamic acid is 0.5-20 wt % of the total weight of the polyisocyanate and the sulphamic acid.

2. The polyisocyanate modified with sulphamic acid according to claim 1, characterized in that:
a) the average functionality of isocyanate is at least 1.8,
b) the content of isocyanate groups is 4.0-35.0 wt %,
c) the content of $SO_3^-$ is 0.1-6.8 wt %, and
d) the polyisocyanate modified with sulphamic acid optionally comprises a polyether with a molecular chain comprising average ethoxy units of 5-30, wherein the content of ethoxy units bonded to the molecular chain of the polyether is 0-15 wt % based on the total weight of the polyisocyanate, the sulphamic acid and the polyether.

3. The polyisocyanate modified with sulphamic acid according to claim 1, characterized in that said polyisocyanate applied in the reaction is one or more of aliphatic, alicyclic, aromatic, araliphatic polyisocyanates and modified polyisocyanates with average isocyanate functionality of 2.0-5.0 and isocyanate groups content of 7.0-32.0 wt %.

4. A preparation method of the polyisocyanate modified with sulphamic acid according to claim 1, characterized in that the polyisocyanate reacts with the sulphamic acid with the formula of

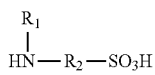

at the presence of a tertiary amine,
wherein in the reaction, the polyisocyanate is added through a two-step adding process, wherein a first portion of the polyisocyanate is mixed with the sulphamic acid, the tertiary amine and optionally a polyether, and the reaction lasts 3-5 h at 95-110° C., then the rest of the polyisocyanate is added, after cooling to room temperature, the polyisocyanate modified with sulphamic acid is obtained; wherein the first portion of the polyisocyanate represents 30-90 wt % of the total weight of the polyisocyanate,
wherein $R_1$ is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, $R_2$ is butyl;
or $R_1$ is one of methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, $R_2$ is propyl;
or $R_1$ is one of cyclohexyl, methyl cyclohexyl, p-methyl cyclohexyl, 2-methyl cyclohexyl, 2,3-dimethyl cyclohexyl, 3,3,5-trimethyl cyclohexyl, 4-tertbutyl cyclohexyl, cycloheptyl, methyl cyclooctyl, 2-norcamphanyl, 2-adamantyl and 3,5-dimethyl-1-adamantyl, $R_2$ is isobutyl; and
wherein the amount of the sulphamic acid is 0.5-20 wt % of the total weight of the polyisocyanate and the sulphamic acid.

5. The method according to claim 4, characterized in that said reaction is carried out under the presence of a polyether comprising ethoxy units, and/or the polyisocyanate used already comprises ethoxy polyether units.

6. The method according to claim 4, characterized in that said polyisocyanate is one or more of aliphatic, alicyclic, aromatic, araliphatic polyisocyanates and modified polyisocyanates with average isocyanate groups functionality of 2.0-5.0, and isocyanate groups content of 7.0-32.0 wt %.

7. The method according to claim 5, characterized in that the content of the ethoxy units bonded to the molecular chain of the polyether is 0-15 wt %, based on the total weight of the polyisocyanate, the sulphamic acid and the polyether, the polyether is monohydric, the number-average molecular weight is 300-1000, and the average number of the ethoxy units in the molecular chain of the polyether is 5-30.

8. The method according to claim 4, characterized in that said tertiary amine is aliphatic and/or alicyclic substituted, non-cyclic and/or cyclic tertiary amine; and
the molar ratio of said tertiary amine to the $SO_3^-$ group of the sulphamic acid is 0.2-2.0:1, and the molar ratio of isocyanate groups and groups which are reactive towards isocyanate groups is kept to 4-300:1.

9. The polyisocyanate modified with sulphamic acid according to claim 1, characterized in that,
$R_1$ is one of cyclohexyl, methyl cyclohexyl, p-methyl cyclohexyl and cycloheptyl, $R_2$ is butyl;
or $R_1$ is methyl cyclohexyl, p-methyl cyclohexyl and 3,3,5-trimethyl cyclohexyl, $R_2$ is propyl;
or $R_1$ is cyclohexyl and methyl cyclohexyl, $R_2$ is isobutyl; and
the amount of said sulphamic acid is 1-10 wt % of the total weight of the polyisocyanate and the sulphamic acid.

10. The polyisocyanate modified with sulphamic acid according to claim 2, characterized in that,
a) the average functionality of isocyanate is 2.0-4.8,
b) the content of isocyanate groups is 6.0-31.0 wt %,
c) the content of $SO_3^-$ is 0.2-4.8 wt %, and
d) the polyisocyanate modified sulphamic acid comprises the polyether with the molecular chain comprising average ethoxy units of 10-20, wherein the content of ethoxy units bonded to the molecular chain of the polyether is 4-12 wt % based on the total weight of the polyisocyanate, the sulphamic acid and the polyether.

11. The polyisocyanate modified with sulphamic acid according to claim 3, characterized in that, said polyisocyanate applied in the reaction is one or more of the aliphatic, alicyclic polyisocyanates and modified polyisocyanates with average isocyanate functionality of 2.0-4.0, and the isocyanate groups content of 12.0-25.0 wt %.

12. The polyisocyanate modified with sulphamic acid according to claim 3, characterized in that, said polyisocyanate applied in the reaction is isocyanurate modified groups-comprising polyisocyanates that are based on one or more of 1,6-hexamethylene diisocyanate, isophorone diisocyanate and 4,4'-dicyclohexyl methane diisocyanate.

13. The polyisocyanate modified with sulphamic acid according to claim 4, characterized in that, R₁ is one of cyclohexyl, methyl cyclohexyl, p-methyl cyclohexyl and cycloheptyl, R₂ is butyl;

or R1 is one of methyl cyclohexyl, p-methyl cyclohexyl and 3,3,5-trimethyl cyclohexyl, R₂ is propyl;

or R₁ is one of cyclohexyl and cyclohexyl methyl, R₂ is isobutyl; and the amount of the sulphamic acid is 1-10 wt % of the total weight of the polyisocyanate and the sulphamic acid.

14. The method according to claim 4, characterized in that, the first portion of the polyisocyanate represents 50-80 wt % of the total weight of the polyisocyanate.

15. The method according to claim 6, characterized in that, said polyisocyanate is one or more of the aliphatic, alicyclic polyisocyanates and modified polyisocyanates with average isocyanate groups functionality of 2.5-4.0, and the isocyanate groups content of 12.0-25.0 wt %.

16. The method according to claim 6, characterized in that, said polyisocyanate is isocyanurate modified groups-comprising polyisocyanates that are based on one or more of 1,6-hexamethylene diisocyanate, isophorone diisocyanate and 4,4'-dicyclohexylmethane diisocyanate.

17. The method according to claim 7, characterized in that the content of the ethoxy units bonded to the polyether chain is 4-12 wt %, based on the total weight of the polyisocyanate, the sulphamic acid and the polyether, the polyether is monohydric, the number-average molecular weight is 400-800, and the number of the ethoxy units is 10-20.

18. The method according to claim 8, characterized in that, said tertiary amine is one or more of triethylamine, dimethyl cyclohexyl amine and N-methylmorpholine; and the molar ratio of said tertiary amine to the $SO_3^-$ group is 0.5-1.5:1, and the molar ratio of the isocyanate groups and groups which are reactive towards the isocyanate groups is kept to 6-200:1.

* * * * *

UNITED STATES PATENT AND TRADEMARK OFFICE
CERTIFICATE OF CORRECTION

PATENT NO. : 9,975,985 B2  
APPLICATION NO. : 14/914223  
DATED : May 22, 2018  
INVENTOR(S) : Xueshun Ji et al.

Page 1 of 1

It is certified that error appears in the above-identified patent and that said Letters Patent is hereby corrected as shown below:

On the Title Page

Under (73) Assignee: "Wanhua Chemical Group Co., Ltd. (CN)" should read --Wanhua Chemical Group Co., Ltd. (CN); Wanhua Chemical (Guangdong) Co., Ltd (CN); Wanhua Chemical (Ningbo) Co., Ltd. (CN)--

Signed and Sealed this  
Tenth Day of July, 2018

Andrei Iancu  
*Director of the United States Patent and Trademark Office*